United States Patent

Blackmer

[15] 3,661,748
[45] May 9, 1972

[54] FAULT SENSING INSTRUMENTATION

[72] Inventor: David E. Blackmer, Harvard, Mass.

[73] Assignee: Instrumentation Laboratory, Inc., Lexington, Mass.

[22] Filed: Apr. 7, 1970

[21] Appl. No.: 27,197

[52] U.S. Cl. ..........................204/195, 204/1 T, 204/195 B, 324/29, 324/30 R
[51] Int. Cl. .........................................................B01k 3/00
[58] Field of Search ................204/1 T, 195 B, 195 F, 195 P; 324/29, 30 R

[56] References Cited

UNITED STATES PATENTS 3,345,273  10/1967  Brown.................................204/1 T Primary Examiner—John H. Mack
Assistant Examiner—W. I. Solomon
Attorney—Willis M. Ertman

[57] ABSTRACT

An electrochemical sensor system includes an electrode assembly that produces a DC signal as a function of a parameter of interest sensed by the electrode system. An AC signal is applied via an electrode to the conductor fluid in which the electrode system is disposed and an AC signal detector is connected to the DC circuitry. A threshold circuit responsive to the output of the AC signal detector indicates fault in the electrochemical sensor system whenever the AC signal detector has an output of predetermined magnitude.

7 Claims, 3 Drawing Figures

FAULT SENSING INSTRUMENTATION

SUMMARY OF INVENTION

This invention relates to instrumentation useful for the measurement of small DC voltages or currents and more particularly to systems for detecting faults in electrochemical sensor mechanisms used in such instrumentation.

A significant change in the resistance of a sensor used in electrochemical instrumentation, for example for measuring partial pressures of hydrogen, oxygen, or carbon dioxide, frequently indicates improper operation or failure of a part of the sensor. In some cases, failure may be heralded by an increase in the electrical resistance of the sensor while in other cases failure may be indicated by a decrease in the electrical resistance of the sensor. Where failures are of such a nature that the DC quantity sensed (voltage or current) increases beyond usual values, it is possible to use a biased threshold failure detection system. Such detection systems however prevent use of that portion of the dynamic range of the sensor above the threshold. Also, such a system is not useful when the parameter sensed becomes smaller rather than larger, particularly where small quantities are measured in normal operation.

Accordingly it is an object of this invention to provide novel and improved fault detection systems for use with electrochemical instrumentation that measures small DC voltages or currents produced by electrochemical sensors.

Another object of the invention is to provide novel and improved fault detection system for use with an electrochemical instrumentation that senses a plurality of different parameters.

Still another object of the invention is to provide novel and improved instrumentation for detecting faults in electrochemical sensors of the type that employ permeable membranes.

A further object of this invention is to provide novel and improved fault detection systems for use in instrumentation of the type for measuring partial pressure of oxygen and pH of blood.

In accordance with the invention there is provided an electrochemical sensor system that includes an electrode system for disposition in a conductive fluid that is arranged to produce a DC signal as a function of a parameter of interest sensed by the electrode system, and DC circuitry responsive to the DC signal from the electrode system for producing an output indicative of the parameter of interest sensed by the electrode system. The system for detecting a sensor fault comprises means for providing an electrical connection to the conductive fluid, mans to apply an AC signal to the electrical connection, an AC signal detector connected to the DC circuitry, and a threshold circuit responsive to the output of the AC signal detector for providing an output signal indicative of a fault in the electrochemical sensor system when the AC signal detector has an output that differs by a predetermined amount from a normal value.

In a particular embodiment, the invention is incorporated in a comprehensive instrument arranged to sense pH, $pO_2$ and $pCO_2$ values of blood samples. The instrumentation includes separate sensor electrode assemblies for the three parameters of interest, each assembly being connected to separate DC circuitry for operating an output device to display an output indicative of the value of the particular sensed parameter. An AC signal source is provided which has a low voltage output and a higher voltage output. The low voltage output is applied to the conductive fluids in which the sensor electrodes are immersed and the higher voltage output is applied to AC signal detector circuitry. In the detector system used with the $pO_2$ and $pCO_2$ sensors, a fault is indicated whenever the sensor resistance becomes so small that the AC signal transmitted through the DC circuitry exceeds a predetermined value; while in the pH system, the detector indicates a fault whenever the source resistance becomes so large that the AC signal is attenuated below a predetermined value. In these arrangements the AC signal derived from the sensor through the DC circuitry is compared with an AC signal from a common source so that the effect of variation of the magnitude of the output from the AC source is eliminated.

It is preferred to employ a phase sensitive detector which permits selection of a more precise threshold value, discrimination against interfering AC signals from other sources; and discrimination between types of signals that may be applied to the AC detector circuitry.

The invention provides sensitive and reliable detection of conduction faults in electrochemical sensor systems. Other objects, features and advantages of the invention will be seen as the following description of a particular embodiment of the invention progresses, in conjunction with the drawings, in which.

DESCRIPTION OF PARTICULAR EMBODIMENT

Figure 1:
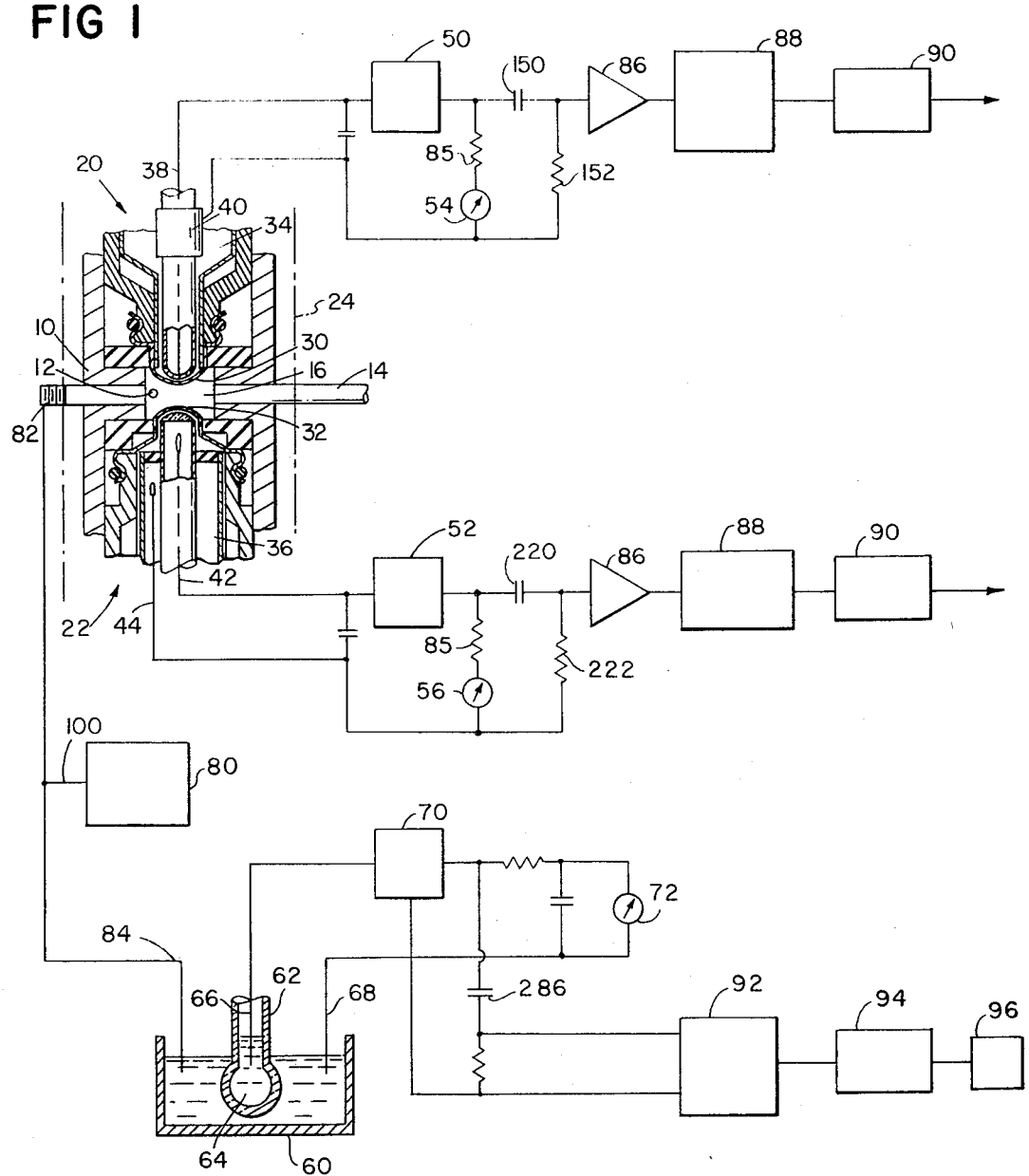
FIG. 1 is a block diagram of an electrochemical sensor system constructed in accordance with the invention.

The system shown in FIG. 1 includes structure 10 having inlet and outlet passage 12 and 14 and a chamber 16 in which a fluid sample may be positioned. Two electrode systems are positioned for insertion into contact with the fluid in chamber 16, a $pO_2$ electrode system 20 and a $pCO_2$ electrode system 22. A water jacket 24 surrounds the cuvette assembly to maintain the chamber 16 at a constant temperature environment. Each electrode assembly 20, 22, includes a membrane 30, 32 which is permeable to the molecules of interest, membrane 30 being permeable to oxygen molecules and membrane 32 being permeable to carbon dioxide molecules. Each membrane separates the sample chamber 16 from an associated electrode compartment 34, 36 which contains a saline solution. Cathode electrode 38 projects through the wall of compartment 34 and its tip is exposed at the end of compartment 34. Anode electrode 40 surrounds compartment 34. Ag/AgCl electrode 42 extends into chamber 36 and a reference electrode 44 is disposed in a surrounding chamber which contains an electrolyte liquid. When the electrodes are of the proper materials and a potential of the proper polarity is applied to the electrodes, a current flows between the electrodes which is proportional to the partial pressure of the parameter of interest. The parameter diffuses through the membranes 30, 32 and causes current flow between the electrodes which is amplified by amplifiers 50, 52, respectively, and an indication is developed by meters 54, 56, respectively.

With respect to the pH sensor, the solution to be measured is in chamber 60 and immersed in that container is another container 62 made of glass and containing an ionized solution 64 into which an electrode 66 is immersed. When the pH of the solution in chamber 60 is different from that of solution 64, a potential difference appears between the opposite sides of the pH sensitive portion of glass 62. A reference electrode 68 is immersed in the solution in chamber 60 and the resulting DC potential difference between electrodes 66 and 68 is proportional to the difference between the pHs of solutions in chambers 60 and 62 plus a constant. This DC potential difference is amplified by amplifier 70 and indicated by output meter 72.

An AC signal from oscillator 80 is applied to these electrode systems, the signal being applied to electrode 82 that is in contact with chamber 16 and to electrode 84 in chamber 60 (or alternatively to reference electrode 68). Should either membrane 30 or 32 leak, the liquid in chamber 16 can affect the accuracy of the reading. As each membrane is an excellent insulator when it is of proper integrity, only a minute AC current can flow from electrode 82 through either membrane 30 or 32 and electrodes 38 and 40 to the measuring circuit. However, if the liquid in chamber 16 contains ions, when a leak develops, sufficient AC current can flow through the leak to produce a significant AC voltage across resistor 85. This resulting signal is amplified by an amplifier 86, rectified by rectifier 88 and applied to the threshold circuit 90 so that when the AC signal exceeds a fixed magnitude, threshold circuit 90 produces an output indicating a defect in the electrode system. In the pH electrode system, if the impedance between electrodes 66 and 68 becomes higher than the input impedance of amplifier 70, as for example when either electrode 66 or 68 is removed from container 60, the AC voltage at the amplifier is much reduced. This AC voltage is rectified by rectifier 92 and compared in a threshold circuit 94. When that voltage drops below a predetermined value, indicator 96 is turned on showing that the pH electrode 62 has been removed from or is making poor contact with the solution in the container 60.

Figure 2:
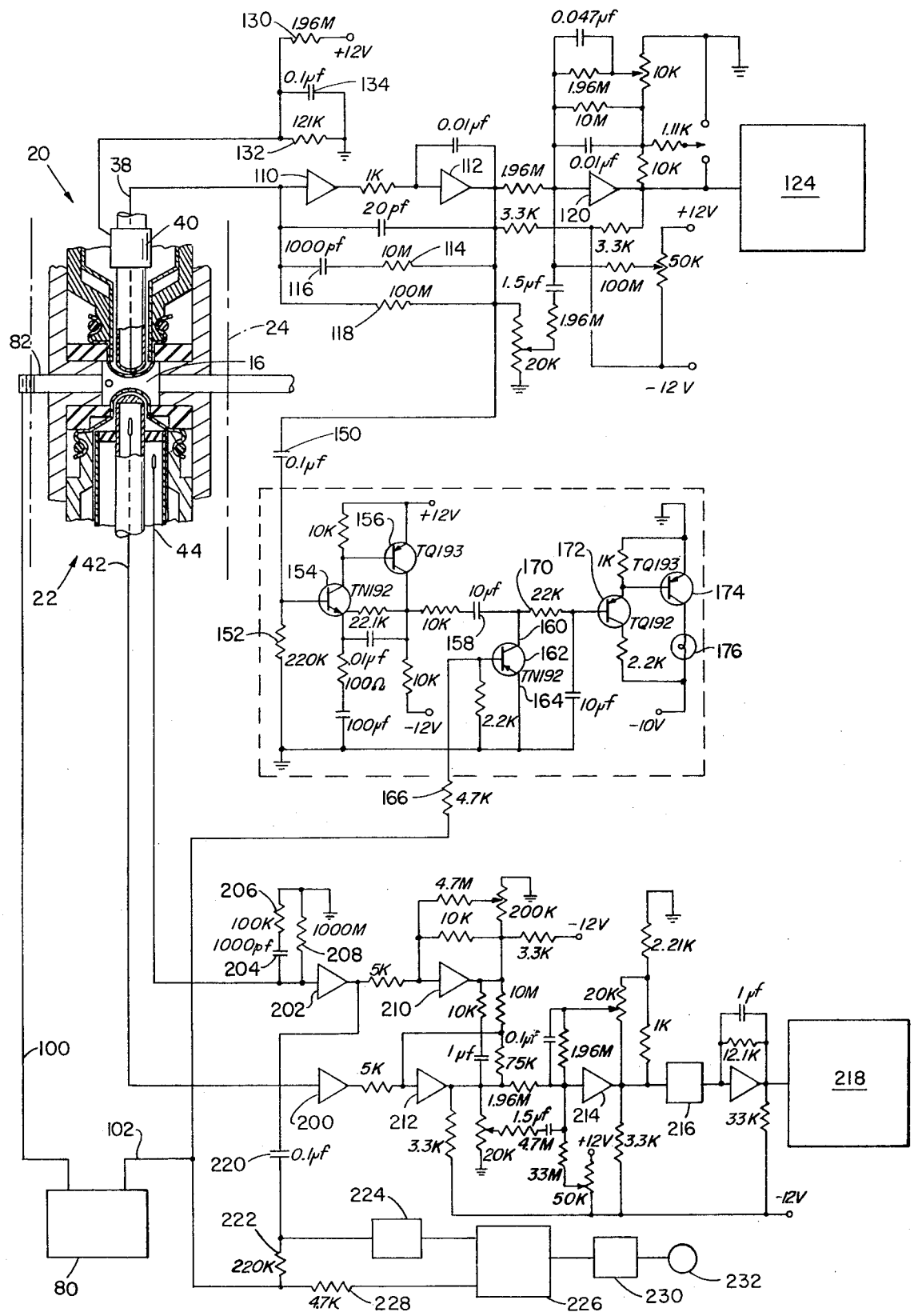
fIG. 2 is a schematic diagram of portions of the $pO_2$ and $pCO_2$ sensor systems of the embodiment shown in FIG. 1.
Figure 3:
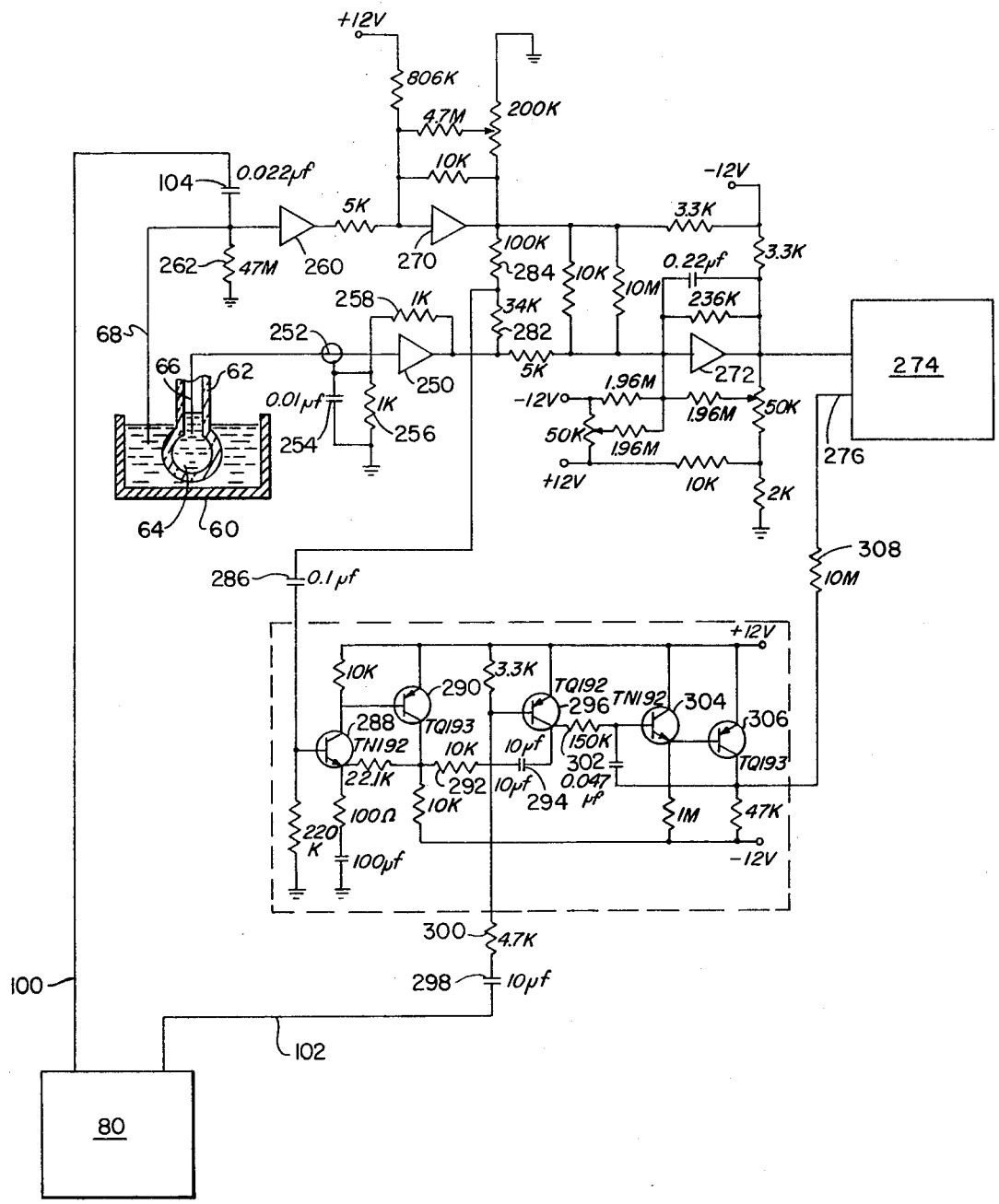
FIG. 3 is a schematic diagram of portions of the pH sensor system of the embodiment shown in FIG. 1.

A schematic diagram of a preferred embodiment of the invention is shown in FIGS. 2 and 3. In that embodiment, the oscillator 80 produces a 170 Hertz signal on two output lines, a 100-millivolt signal on line 100 and a 24 volt signal on line 102. The one hundred millivolt signal is applied to electrode 82 in the cuvette chamber 16 and to the reference electrode 68 via coupling capacitor 104.

In the oxygen electrode 20, the leakage to the cathode area is critical. The cathode 38 is connected through an impedance transforming amplifier 110 to an operation amplifier stage 112 so that the input is maintained at virtual ground. AC gain of the amplifier is controlled by the feedback path that includes resistor 114 and capacitor 116. DC gain is controlled by the feedback resistor 118. The output of amplifier 112 is coupled through a further operational amplifier stage 120 to a servo control circuit 124 for operating a display of the value sensed by oxygen electrode assembly 20.

The anode electrode 40 is connected to a network of resistors 130, 132 and capacitor 134 which applies to a 0.6 volt polarizing signal to the electrode system 20.

Also connected to the output of amplifier 112 is capacitor 150 and resistor 152. The junction between capacitor 150 and resistor 152 is connected to an amplifier stage that includes transistors 154 and 156. A phase sensitive demodulation circuit is connected to the output of the amplifier stage and includes coupling capacitor 158 which is connected to the collector 160 of transistor 162. The emitter 164 of transistor 162 is grounded and the base electrode is connected through resistor 166 to the 24 volt square wave signal from oscillator 80. The demodulated output signal from the demodulation circuit is coupled by resistor 170 to the output amplifier which includes transistors 172, 174. A lamp 176, connected in the collector circuit of transistor 174 provides an indication of the condition of the membrane 30 of the oxygen electrode 20.

This circuit and the component values as indicated energizes lamp 176 when the current flowing to capacitor 150 exceeds a value of about two nanoamperes, corresponding to a membrane resistance of less than 50 megohms.

The carbon dioxide electrode 22 has a pH electrode 42 connected to impedance transforming amplifier 200 and its reference electrode 44 connected to impedance transforming amplifier 202. Also connected to the reference electrode is a circuit that includes capacitor 204 and resistor 206 which has an effective AC impedance of about 100 kilohms. Resistor 208 establishes a relationship to ground for the electrode system 22. The impedance transforming amplifiers are connected to a differential amplifier arrangement that includes operational amplifier circuits 210 and 212. The output of the differential amplifier is applied to a derivative circuit that includes operational amplifier 214 followed by an antilog circuit 216 whose output is applied to a servo control circuit 218.

An AC signal is from the output of amplifier 202 is coupled by capacitor 220 connected to resistor 222 to two stage AC amplifier 224. The output of the AC amplifier is applied to a demodulation circuit 226. A 24 volt signal from oscillator 80 is applied over line 102 through resistor 228 to the base electrode of a transistor in the demodulation circuit 226. As in the case of the circuitry coupled to the oxygen electrode 20, these circuit values are selected so that the capacitive component of the membrane conductance is rejected. The output signal is applied through an output amplifier 230 which has a lamp 232 connected in the collector circuit of its output transistor. In this circuit, a voltage in excess of 20 millivolts is applied to the capacitor 220 (corresponding to a membrane leakage impedance of less than 400,000 ohms) will energize lamp 232.

In the pH electrode system as shown in FIG. 3, the pH electrode 62 has a typical impedance of in the order of 100 megohms and is connected to an impedance transforming amplifier 250 through a shielded conductor 252. The shield of conductor 252 is connected through a guard circuit that includes capacitor 254 and resistors 256, 258 to the output of amplifier 250 to reduce the effect of the capacitance of the cable 252.

The reference electrode 68 is connected to impedance transforming amplifier 260. Also connected to the input of amplifier 260 is a network that includes resistor 262 and capacitor 104. The 100 millivolt signal from line 100 is applied to reference electrode 68 via capacitor 104 and also passes through amplifier 260 for application to operational amplifier 270 that has a gain of two. The output from amplifier 250 is connected to operational amplifier 272 which is connected in a differential amplifier arrangement with amplifier 270 and its output is applied to a servo control circuit 274 that has a servo clamp input 276.

The output of operation amplifier 270 and the output of impedance transforming amplifier 250 are connected together through a resistance network of resistors 282 and 284. The junction between resistors 282 and 284 is connected through capacitor 286 to the input of an AC amplifier that includes transistors 288 and 290. The output of the AC amplifier is coupled through resistor 292 and capacitor 294 for modification by demodulation circuitry including transistor 296. The 24 volt AC signal from oscillator 80 is applied through capacitor 298 and resistor 300 to the base of transistor 296. The output of the demodulator is coupled by resistor 302 to a two-stage output amplifier that includes transistor 304 and 306 and the output of that amplifier is coupled by resistor 308 to the servo clamp input 276. The indicated component values in this embodiment are selected to apply a plus 12 volt clamping voltage to the servo circuit 274 when the AC signal output of amplifier 250 is less than about 68 percent of the check signal applied to reference electrode 68 on line 100. The sizes of resistors 282 or 284 determine the location of the decision point at which the servo circuit 274 is clamped.

Thus this embodiment incorporates fault detection for three different types of electrochemical sensors, and produces a check on the proper operation of each sensor as a function of a particular characteristic of that sensor. A superimposed AC signal is employed to sense the status of the sensor. Through the use of a demodulation signal derived from the same source as the AC signal applied to the electrode systems, greater sensitivity is achieved. Further, in the preferred embodiment described above the phase angle of the demodulator is controlled so that the resistive component of the electrode membrane conductance is detected and the capacitive component is rejected. The system of the invention thus provides particularly sensitive monitoring of electrochemical sensors. Additional details of a blood analysis system in which this apparatus is incorporated are set out in copending application, Ser. No. 27,200, entitled "Fluid Analyzing Apparatus" filed April 7, 1970 in the name of Spergel et al. and assigned to the same assignee as this application.

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention.

What is claimed is:

1. In an electrochemical sensor system having an electrode system for disposition in a conductive fluid and arranged to produce a DC signal as a function of a parameter of interest sensed by said electrode system, and DC circuitry responsive to said DC signal for producing an output indicative of the parameter of interest being sensed by said electrode system,
a system for detecting a sensor defect comprising:
means for providing an electrical connection to said conductive fluid,
means to apply an AC signal to said electrical connection,
a phase sensitive AC signal detector connected to said DC circuitry,
and a threshold circuit responsive to the output of said AC signal detector for providing an output signal indicative of fault in said electrochemical sensor system when said AC signal detector has an output of a predetermined value.

2. The system as claimed in claim 1 and further including means for applying a reference signal from said AC signal source to said phase sensitive detector.

3. The system as claimed in claim 1 wherein said phase sensitive detector includes means for discriminating against the capacitive component of the AC signal passed through said DC circuitry from said electrode system.

4. The system as claimed in claim 1 and further including means responsive to said threshold circuit output signal for producing a control function.

5. An electrochemical sensor system having an electrode system for disposition in a conductive fluid and arranged to produce a DC signal as a function of a parameter of interest sensed by said electrode system, said electrode system including an active electrode and a reference electrode, DC circuitry responsive to said DC signal for producing an output indicative of the parameter of interest being sensed by said electrode system, an impedance network connected to said reference electrode, said impedance network determining a threshold value, means for providing an electrical connection to said conductive fluid, means to apply an AC signal to said electrical connection, an AC signal detector connected to said DC circuitry, and a threshold circuit responsive to the output of said AC signal detector for providing an output signal indicative of fault in said electrochemical sensor system when said AC signal detector has an output of predetermined value relative to said threshold value.

6. An electrochemical sensor system having an electrode system for disposition in a conductive fluid and arranged to produce a DC signal as a function of a parameter of interest sensed by said electrode system, said electrode system including an anode electrode and a cathode electrode, DC circuitry responsive to said DC signal for producing an output indicative of the parameter of interest being sensed by said electrode system, said DC circuitry including an operational amplifier of the trans-resistance type, an AC gain network connected in the feedback loop of said operational amplifier for establishing a threshold level, means for providing an electrical connection to said conductive fluid, means to apply an AC signal to said electrical connection, an AC signal detector connected to said DC circuitry, and a threshold circuit responsive to the output of said AC signal detector for providing an output signal indicative of fault in said electrochemical sensor system when said AC signal detector has an output of predetermined value relative to said threshold level.

7. An electrochemical sensor system having an electrode system for disposition in a conductive fluid and arranged to produce a DC signal as a function of a parameter of interest sensed by said electrode system, said electrode system including a pH electrode and a reference electrode, DC circuitry including a differential amplifier responsive to said DC signal for producing an output indicative of the parameter of interest being sensed by said electrode system, an AC signal detector connected to said DC circuitry, means for applying an AC signal to said reference electrode, a difference network connected between the outputs of said pH and reference electrodes for applying a difference signal to said AC signal detector, the component values in said difference circuitry determining a threshold value and a threshold circuit responsive to the output of said AC signal detector for providing an output signal indicative of fault in said electro-chemical sensor system when said AC signal detector has an output of predetermined value relative to said threshold value.

* * * * *